(12) United States Patent
Semat et al.

(10) Patent No.: US 9,753,052 B2
(45) Date of Patent: Sep. 5, 2017

(54) METHOD AND DEVICE FOR ESTIMATING THE MACH NUMBER OF AN AIRCRAFT

(71) Applicant: Airbus Operations (SAS), Toulouse (FR)

(72) Inventors: Maxime Semat, Toulouse (FR); Martin Delporte, Fonsorbes (FR)

(73) Assignee: AIRBUS OPERATIONS SAS, Toulouse (FR)

( * ) Notice: Subject to any disclaimer, the term of this patent is extended or adjusted under 35 U.S.C. 154(b) by 114 days.

(21) Appl. No.: 14/805,131

(22) Filed: Jul. 21, 2015

(65) Prior Publication Data

US 2016/0025764 A1    Jan. 28, 2016

(30) Foreign Application Priority Data

Jul. 23, 2014   (FR) ..................... 14 57105

(51) Int. Cl.
| | |
|---|---|
| *G01F 1/46* | (2006.01) |
| *G01P 13/00* | (2006.01) |
| *G01W 1/00* | (2006.01) |
| *G01P 5/175* | (2006.01) |
| *G01P 5/14* | (2006.01) |
| *G01P 13/02* | (2006.01) |

(52) U.S. Cl.
CPC ................ *G01P 5/175* (2013.01); *G01P 5/14* (2013.01); *G01P 13/025* (2013.01)

(58) Field of Classification Search
None
See application file for complete search history.

(56) References Cited

U.S. PATENT DOCUMENTS

| | | | | |
|---|---|---|---|---|
| 6,588,285 | B1 * | 7/2003 | Vozhdaev | G01P 13/02 73/170.02 |
| 6,594,559 | B2 * | 7/2003 | Alwin | G05D 1/0204 701/14 |
| 7,480,548 | B2 * | 1/2009 | Shigemi | G01O 5/005 701/7 |
| 7,617,023 | B2 * | 11/2009 | Seve | G01P 5/16 701/7 |
| 9,043,054 | B2 * | 5/2015 | Feau | F01D 17/06 701/14 |

(Continued)

FOREIGN PATENT DOCUMENTS

| | | |
|---|---|---|
| FR | 2977942 | 1/2013 |
| GB | 2424957 | 10/2006 |
| WO | 2013017746 | 2/2013 |

OTHER PUBLICATIONS

French Search Report, Nov. 19, 2014.

*Primary Examiner* — Peter Macchiarolo
*Assistant Examiner* — Jermaine Jenkins
(74) *Attorney, Agent, or Firm* — Greer, Burns & Crain, Ltd.

(57) ABSTRACT

A measurement unit for measuring a first static pressure of the ambient air in a first measurement zone of the aircraft, a measurement unit for measuring a second pressure of the ambient air, at least one static pressure probe, in a second measurement zone of the aircraft, the second pressure having a value lower than the first static pressure, a computation unit for estimating a Mach number using these two measured pressures and a data transmission unit configured to transmit the estimated Mach number to a user system.

10 Claims, 1 Drawing Sheet

(56) References Cited

U.S. PATENT DOCUMENTS

| | | |
|---|---|---|
| 2006/0225496 A1 | 10/2006 | Schauer et al. |
| 2013/0018533 A1 | 1/2013 | Feau et al. |
| 2013/0204544 A1* | 8/2013 | Thomas ............... G01P 21/025 702/41 |
| 2014/0257745 A1 | 9/2014 | Schegerin |
| 2016/0107762 A1* | 4/2016 | Goupil ................. B64D 43/02 701/3 |

* cited by examiner

METHOD AND DEVICE FOR ESTIMATING THE MACH NUMBER OF AN AIRCRAFT

CROSS-REFERENCES TO RELATED APPLICATIONS

This application claims the benefit of the French patent application No. 1457105 filed on Jul. 23, 2014, the entire disclosures of which are incorporated herein by way of reference.

BACKGROUND OF THE INVENTION

It is known that the Mach number of an aircraft is defined as the ratio between the speed of the aircraft and the speed of sound in the flying conditions of the aircraft. The laws of thermodynamics make it possible to define a relationship between the Mach number of the airflow, the total pressure Pt and the static pressure Ps, which is formulated as follows:

$$M = \sqrt{\frac{2}{\gamma-1}\left[\left(\frac{Pt}{Ps}\right)^{\frac{\gamma-1}{\gamma}} - 1\right]}$$

In this equation, γ represents the adiabatic index, which is equal to 1.4 for air. Using this equation, the measurements of the static pressure Ps and of the total pressure Pt are sufficient to calculate the Mach number M.

The static pressure Ps corresponds to the atmospheric pressure which depends on the altitude of the aircraft and on the temperature of the ambient medium. It can be measured using a probe placed on the aircraft.

Furthermore, the total pressure Pt corresponds to the sum of the static pressure and of the impact pressure due to the speed of the aircraft. The total pressure Pt is measured by Pitot probes.

In case of errors originating from the Pitot probes, the Mach number calculated using the abovementioned equation may therefore be wrong.

Patent CA2783222 discloses a method for measuring the Mach number using measurements of two static pressures at the level of the engine. These measurements make it possible to produce an estimation of a static pressure Ps and an estimation of a total pressure Pt. By introducing these estimated pressure values into the abovementioned equation, an estimation of the Mach number M is then obtained. However, the static pressure probe which makes it possible to produce such an estimation of a total pressure is not available on all types of aircraft and on all types of engines.

SUMMARY OF THE INVENTION

The present invention relates to a method for estimating the Mach number of an aircraft, making it possible to estimate the Mach number without using a total pressure value, in order to be able notably to provide the pilot with information on the Mach number even in the absence of a reliable total pressure value available on the aircraft.

To this end, said method for estimating the Mach number comprises, according to the invention, the following successive steps consisting, in an automatic manner, in:

A) measuring a first static pressure Ps of the ambient air in a first measurement zone situated on the aircraft;

B) measuring a second pressure P of the ambient air, by means of at least one static pressure probe, in a second measurement zone situated on the aircraft, said second pressure P having a value lower than said first static pressure Ps;

C) estimating a Mach number of the aircraft, using the following expression:

$$M = \sqrt{\frac{\sqrt{k^4+4k^2}-k^2}{2}}$$

the parameter k bearing out the expression $$k = Z\left(1 - \frac{P}{Ps}\right)$$

in which Z is a parameter dependent on the position of the second measurement zone on the aircraft; and D) transmitting the duly estimated Mach number to a user system.

By virtue of the invention, it is possible to estimate the Mach number by using only two static pressure measurements. Thus, there is no need to use a total pressure value (measured by Pitot probes) and it is therefore possible to calculate an estimated Mach number, even in the absence of a reliable total pressure value (absence of value or wrong value) available on the aircraft.

According to different embodiments of the invention, which can be taken together or separately:

the second measurement zone is located on a fuselage of the aircraft, the parameter Z bearing out the following relationship $$Z = \frac{2}{Cpo * \gamma}$$

in which Cpo is a constant pressure coefficient and γ is the adiabatic index of the air;

the second measurement zone is located in the nacelle of an engine of the aircraft, the parameter Z bearing out the following relationship Z=(aN1+b) in which a and b are constants determined empirically and N1 represents the speed of rotation of the fan of the engine;

the step A comprises substeps of:

Aa) measuring a first intermediate static pressure Ps' and a second intermediate static pressure Ps" in said first measurement zone, respectively, at a first intermediate measurement point and a second intermediate measurement point; and Ab) estimating the first static pressure Ps by averaging the first and the second intermediate static pressures Ps' and Ps" measured in the preceding step Aa);

the first intermediate measurement point and the second intermediate measurement point are situated on a fuselage of the aircraft, on either side of a longitudinal axis of the aircraft.

The present invention relates also to a device for estimating the Mach number of an aircraft.

According to the invention, the estimation device comprises:

a first measurement unit configured to measure a first static pressure Ps of the ambient air in a first measurement zone of the aircraft;

a second measurement unit configured to measure a second pressure P of the ambient air, by means of at least one static pressure probe, in a second measurement zone of the aircraft, the second pressure P having a value lower than the first static pressure Ps;

a computation unit configured to estimate a Mach number of the aircraft, using the following expression:

$$M = \sqrt{\frac{\sqrt{k^4 + 4k^2} - k^2}{2}}$$

the parameter k bearing out the expression $$k = Z\left(1 - \frac{P}{P_S}\right)$$

in which Z is a parameter dependent on the position of the second measurement zone on the aircraft; and a data transmission unit configured to transmit the estimated Mach number to an user system.

The invention relates also to an aircraft, in particular a transport airplane, which comprises a device such as that described previously.

In a particular embodiment, the first measurement unit comprises a first and a second measurement probes configured to measure a first intermediate static pressure Ps' and a second intermediate static pressure Ps", said first measurement unit further comprising a computer configured to determine the first static pressure Ps by averaging the first and the second intermediate static pressures Ps' and Ps".

Advantageously, the first and the second measurement probes are positioned on a fuselage of the aircraft, on either side of a longitudinal axis of the aircraft.

DETAILED DESCRIPTION OF THE PREFERRED EMBODIMENTS

Figure 1:
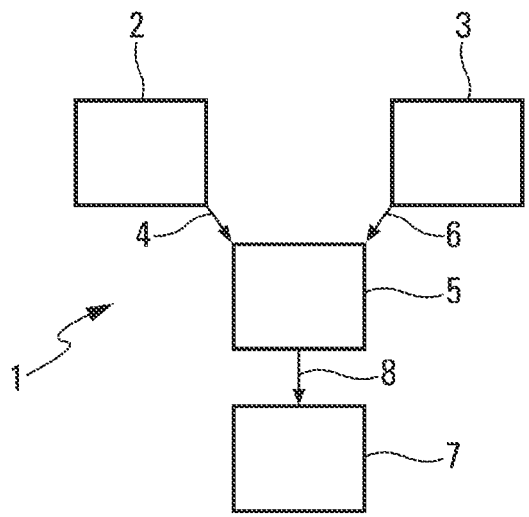
FIG. 1 is a schematic view representing a device for estimating the Mach number of an aircraft.

A device 1 for estimating the Mach number M of an aircraft, notably of a transport airplane, is represented schematically in FIG. 1.

Such an estimation device 1 (hereinafter denoted device 1) comprises, according to the invention, a first measurement unit 2 configured to measure a first static pressure Ps of the ambient air in a first measurement zone of the aircraft and a second measurement unit 3 configured to measure a second pressure P of the ambient air, in a second measurement zone of the aircraft, the second pressure P having a value lower than the first static pressure Ps. The first measurement unit 2 measures the first static pressure using at least one static pressure measurement probe, and notably a plurality of measurement probes as described hereinbelow.

Similarly, the second measurement unit 3 measures the second pressure P using at least one static pressure measurement probe called static pressure probe.

The device 1 also comprises a computation unit 5 configured to estimate the Mach number using the following expression:

$$M = \sqrt{\frac{\sqrt{k^4 + 4k^2} - k^2}{2}}$$

the parameter k bearing out the expression $$k = Z\left(1 - \frac{P}{P_S}\right)$$

in which Z is a parameter dependent on the position of the second measurement zone on the aircraft.

The data collected by the first and the second measurement units 2 and 3 are transmitted to the computation unit 5, respectively, via links 4 and 6.

The device 1 further comprises a data transmission unit (link 8) configured to transmit the estimated Mach number to a user system 7, for example to a display unit or to an embedded system (or computer).

Zones for measuring the first static pressure Ps and the second pressure P are chosen which make it possible to obtain a difference in values between the first static pressure Ps and the second pressure P. Indeed, the greater the difference between the value of the first static pressure Ps and the value of the second pressure P, the better the estimation of the Mach number M and therefore of the air speed CAS of the aircraft. To this end, provision is made notably to position the first measurement unit 2 at a point of the aircraft where the static pressure does not depend much on the Mach number M and the second measurement unit 3 at a point of the aircraft which does, on the contrary, depend heavily on the Mach number M. In other words, a choice is made to position the first measurement zone on the aircraft at a position less disturbed by the flow of air flowing along the aircraft than the second zone.

Furthermore, as the Mach number increases, the measurement of the second pressure P becomes smaller and increasingly lower than the first static pressure Ps. The function Ps/P is therefore a monotonic function increasing as a function of the Mach number.

Thus, the estimation of the Mach number is all the more accurate when the Mach number is high—as long as the flow remains subsonic—and the quotient Ps/P is high.

Consequently, preferably, to obtain the best possible accuracy and to maximize the validity range of the estimation, the second measurement zone for the second pressure P is placed so as to maximize the quotient Ps/P.

Thus, by knowing the value of the ratio between P and Ps, it is possible to know the range of speeds within which the estimation of the speed of the aircraft lies.

Figure 2:
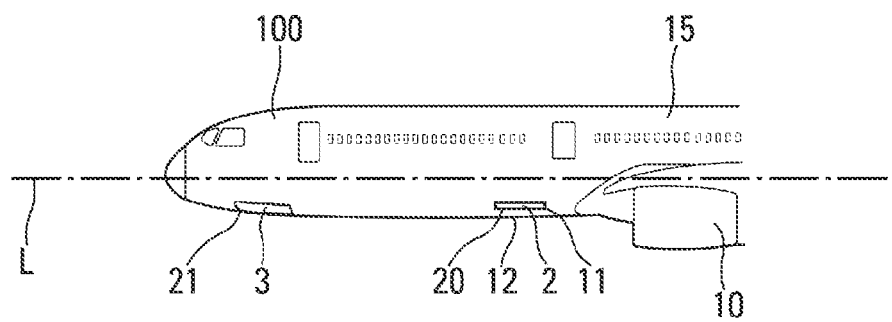
FIG. 2 is a schematic view representing an aircraft comprising the device of FIG. 1.

FIG. 2 illustrates an exemplary positioning of the first and second measurement zones 20 and 21 making it possible to obtain such a difference in values between the first static pressure Ps and the second pressure P.

The first measurement zone 20 is situated on the fuselage 15 of the aircraft 100. As explained previously, the first measurement unit 2 comprises at least one measurement probe situated in the first measurement zone 20. In the exemplary embodiment illustrated in FIG. 2, the first measurement unit 2 comprises a plurality of probes 11 and 12 and in particular two probes, called first and second probes 11 and 12, respectively measuring a first and a second intermediate static pressures Ps' and Ps". The first measurement unit 2 then comprises a computer (not represented) which is configured to determine the first static pressure Ps by, preferably, averaging the first and second intermediate pressures Ps' and Ps" measured.

In a particular embodiment of the invention, the first and the second intermediate static pressures Ps' and Ps" are measured, respectively, on either side of a longitudinal axis L of the aircraft 100 at a first and a second intermediate measurement points. It will be understood here that the first and the second probes 11 and 12 are situated on either side of the longitudinal axis L of the aircraft 100.

According to a first variant, represented in FIG. 2, of this particular embodiment, the first and the second intermediate static pressures Ps' and Ps" are measured on the lateral sides of the aircraft 100. The first and the second probes 11, 12 are then situated on the sides of the aircraft 100. In this variant embodiment, the first static pressure Ps is therefore measured by averaging two intermediate pressures Ps' and Ps" measured on the sides of the aircraft 100. By averaging the first static pressure in this way, the errors due to the sideslip angle of the aircraft are reduced.

In a particular variant, the first and the second intermediate static pressures Ps' and Ps" are measured on the two faces of a vertical tail unit (not represented) of the aircraft 100.

As represented in FIG. 2, the second measurement zone 21 (relating to the measurement unit 3) is located on the fuselage 15 of the aircraft 100. The second measurement zone 21 is in particular situated in front of the first measurement zone 20, because, at this point of the aircraft 100, the measurement of the static pressure is more sensitive to the flow of air and the second pressure P measured will be lower than the first static pressure Ps. In this configuration, the parameter Z bears out the following relationship $$Z = \frac{2}{Cpo * \gamma}$$

in which Cpo is a constant pressure coefficient and $\gamma$ is the adiabatic index of the air. Cpo does not depend on the Mach number M, but on the shape of the object on which it is located.

Alternatively, in an embodiment not represented, the second measurement zone 21 is located in the nacelle of an engine 10 of the aircraft 100. A choice is made to position the second measurement zone 21 in the nacelle of the engine 10 of the aircraft 100 because the second pressure P measured in this zone is lower than that measured in the first measurement zone located on the fuselage. The parameter Z then bears out the following relationship Z=(aN1+b) in which a and b are constants determined empirically and N1 represents the speed of rotation of the fan of the engine 10. The constants a and b are determined empirically notably using measurements performed during test flights.

Figure 3:
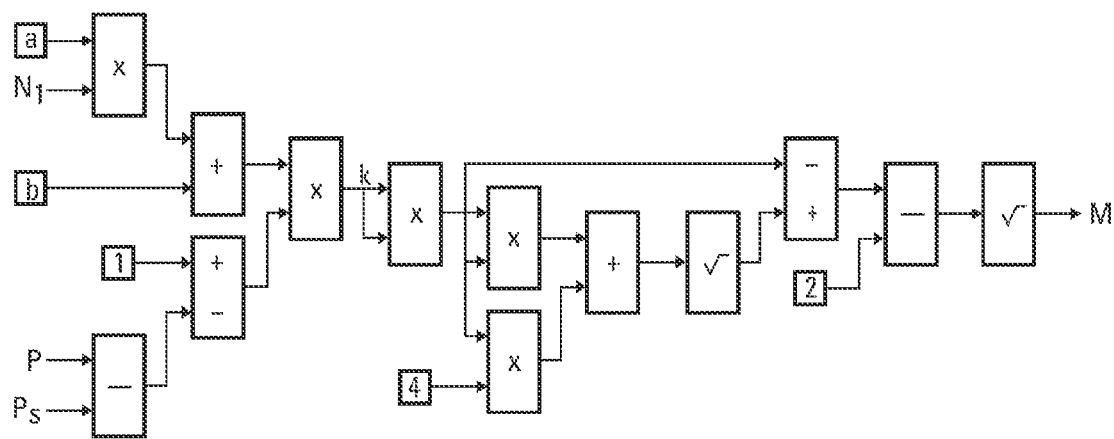
FIG. 3 is a schematic view representing the computation steps of a computation unit of the device of FIG. 1.

FIG. 3 schematically illustrates the computation steps performed by the computation unit 5 in the case where the second measurement unit 3 is situated on the nacelle of the engine 10 of the aircraft. In the case where the second measurement unit 3 is placed on the fuselage 15 of the aircraft 100 as seen previously, the expression aN1+b in this FIG. 3 is replaced by a constant.

The invention also allows the second measurement zone 21 to be positioned at other points of the aircraft 100 allowing for a measurement lower than the second pressure P relative to the first static pressure Ps, such as, for example, on a vertical tail unit of the aircraft 100.

While at least one exemplary embodiment of the present invention(s) is disclosed herein, it should be understood that modifications, substitutions and alternatives may be apparent to one of ordinary skill in the art and can be made without departing from the scope of this disclosure. This disclosure is intended to cover any adaptations or variations of the exemplary embodiment(s). In addition, in this disclosure, the terms "comprise" or "comprising" do not exclude other elements or steps, the terms "a" or "one" do not exclude a plural number, and the term "or" means either or both. Furthermore, characteristics or steps which have been described may also be used in combination with other characteristics or steps and in any order unless the disclosure or context suggests otherwise. This disclosure hereby incorporates by reference the complete disclosure of any patent or application from which it claims benefit or priority.

The invention claimed is:

1. A method for estimating the Mach number of an aircraft, comprising the following steps carried out in an automatic manner:

measuring a first static pressure Ps of the ambient air in a first measurement zone that is located on a fuselage of the aircraft;

measuring a second pressure P of the ambient air, via at least one static pressure probe, in a second measurement zone situated on the aircraft, said second pressure P having a value lower than the first static pressure Ps;

estimating a Mach number of the aircraft, using the following expression:

$$M = \sqrt{\frac{\sqrt{k^4 + 4k^2} - k^2}{2}}$$

the parameter k bearing out the expression $$k = Z\left(1 - \frac{P}{Ps}\right)$$

in which Z is a parameter dependent on the position of the second measurement zone on the aircraft; and transmitting the estimated Mach number to a user system.

2. The method as claimed in claim 1, wherein the second measurement zone is located on the fuselage of the aircraft, the parameter Z bearing out the following relationship $$Z = \frac{2}{Cpo * \gamma}$$

in which Cpo is a constant pressure coefficient and $\gamma$ is the adiabatic index of the air.

3. The method as claimed in claim 1, wherein the second measurement zone is located in a nacelle of an engine of the aircraft, the parameter Z bearing out the following relationship Z=(aN1+b) in which a and b are constants determined empirically and N1 represents the speed of rotation of the fan of the engine.

4. The method as claimed in claim 1, wherein the step of measuring a first status pressure comprises the following substeps:

measuring a first intermediate static pressure Ps' and a second intermediate static pressure Ps" in said first measurement zone, respectively, at a first intermediate measurement point and a second intermediate measurement point; and estimating the first static pressure Ps by averaging the first and the second intermediate static pressures Ps' and Ps" measured in the preceding substep.

5. The method as claimed in claim 4, wherein the first intermediate measurement point and the second intermediate measurement point are situated on the fuselage of the aircraft, respectively on either side of a longitudinal axis of the aircraft.

6. A device for estimating the Mach number of an aircraft, comprising:
   a first measurement unit configured to measure a first static pressure Ps of ambient air in a first measurement zone of the aircraft that is located on a fuselage of the aircraft;
   a second measurement unit configured to measure a second pressure P of the ambient air, by means of at least one static pressure probe, in a second measurement zone of the aircraft, the second pressure P having a value lower than the first static pressure Ps;
   a computation unit configured to estimate a Mach number of the aircraft, using the following expression:

$$M = \sqrt{\frac{\sqrt{k^4 + 4k^2} - k^2}{2}}$$

the parameter k bearing out the expression $$k = Z\left(1 - \frac{P}{Ps}\right)$$

in which Z is a parameter dependent on the position of the second measurement zone on the aircraft; and
   a data transmission unit configured to transmit the estimated Mach number to an user system.

7. An aircraft comprising a device for estimating the Mach number of an aircraft, the device comprising:
   a first measurement unit configured to measure a first static pressure Ps of ambient air in a first measurement zone of the aircraft that is located on a fuselage of the aircraft;
   a second measurement unit configured to measure a second pressure P of the ambient air, by means of at least one static pressure probe, in a second measurement zone of the aircraft, the second pressure P having a value lower than the first static pressure Ps;
   a computation unit configured to estimate a Mach number of the aircraft, using the following expression:

$$M = \sqrt{\frac{\sqrt{k^4 + 4k^2} - k^2}{2}}$$

the parameter k bearing out the expression $$k = Z\left(1 - \frac{P}{Ps}\right)$$

in which L is a parameter dependent on the position of the second measurement zone on the aircraft; and
   a data transmission unit configured to transmit the estimated Mach number to an user system.

8. The aircraft as claimed in claim 7, wherein the first measurement unit comprises a first and a second measurement probe configured to measure a first intermediate static pressure Ps' and a second intermediate static pressure Ps", said first measurement unit further comprising a computer configured to determine the first static pressure Ps by averaging the first and the second intermediate static pressures Ps' and Ps".

9. The aircraft as claimed in claim 8, wherein the first and the second measurement probes are positioned on the fuselage of the aircraft, on either side of a longitudinal axis of the aircraft.

10. A device for estimating the Mach number of an aircraft, the device comprising:
   a first measurement unit configured to measure a first static pressure Ps of ambient air in a first measurement zone of the aircraft;
   a second measurement unit configured to measure a second pressure P of the ambient air, by means of at least one static pressure probe, in a second measurement zone of the aircraft, the second pressure P having a value lower than the first static pressure Ps;
   a computation unit configured to estimate a Mach number of the aircraft, using the following expression:

$$M = \sqrt{\frac{\sqrt{k^4 + 4k^2} - k^2}{2}}$$

the parameter k bearing out the expression $$k = Z\left(1 - \frac{P}{Ps}\right)$$

in which Z is a parameter dependent on the position of the second measurement zone on the aircraft; and
   a data transmission unit configured to transmit the estimated Mach number to an user system;
   wherein the first measurement unit comprises a first and a second measurement probe configured to measure a first intermediate static pressure Ps' and a second intermediate static pressure Ps", said first measurement unit further comprising a computer configured to determine the first static pressure Ps by averaging the first and the second intermediate static pressures Ps' and Ps"; and
   wherein the first and the second intermediate static pressures Ps', Ps" are measured on two respective faces of a vertical tail unit of the aircraft.

* * * * *